Sept. 30, 1969  J. L. PETERSON  3,469,719
NONCYLINDRICAL PARTICLE STORAGE FACILITY
Filed March 29, 1968  4 Sheets-Sheet 1
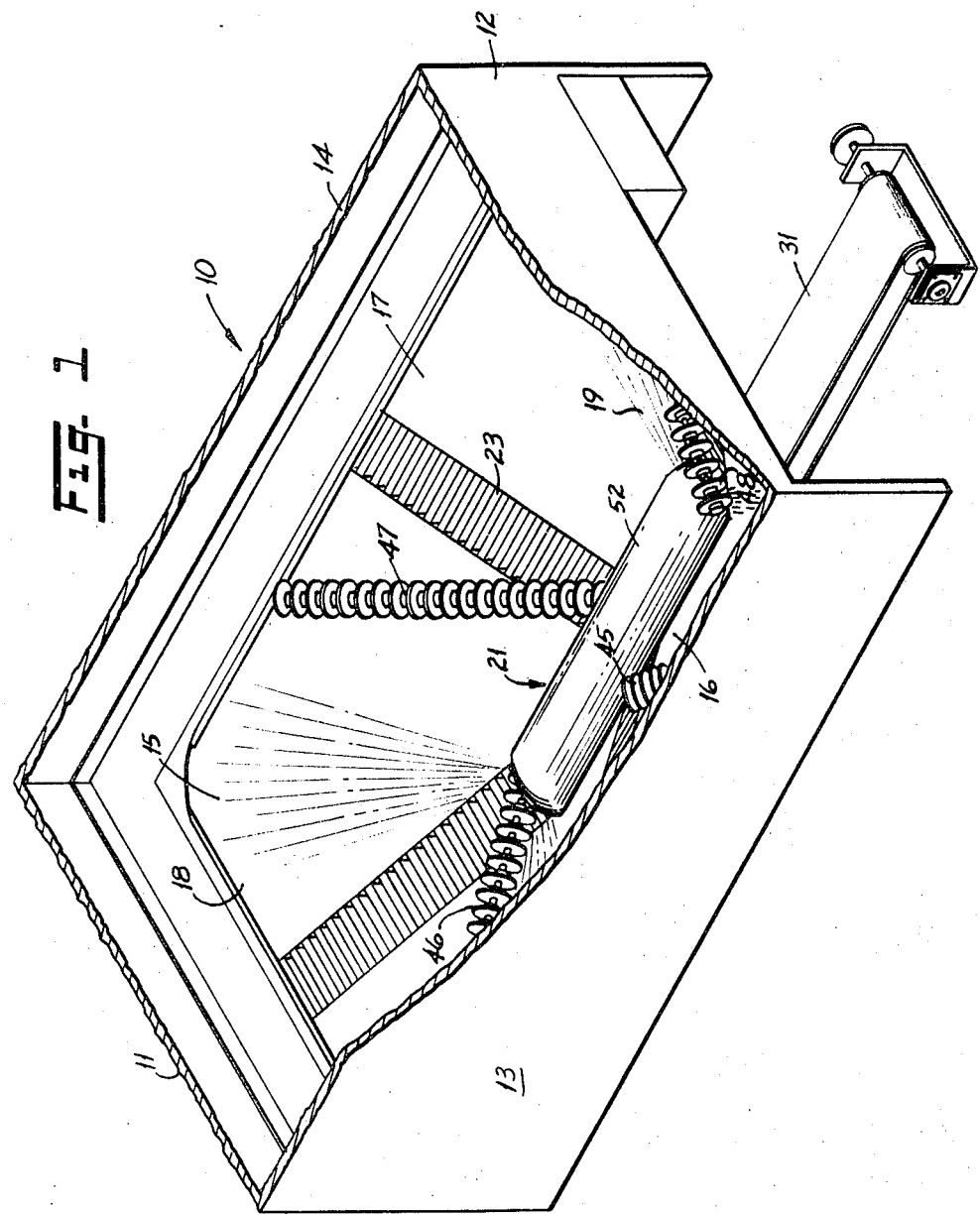
INVENTOR.
JOHN L. PETERSON
BY
Wells & St. John

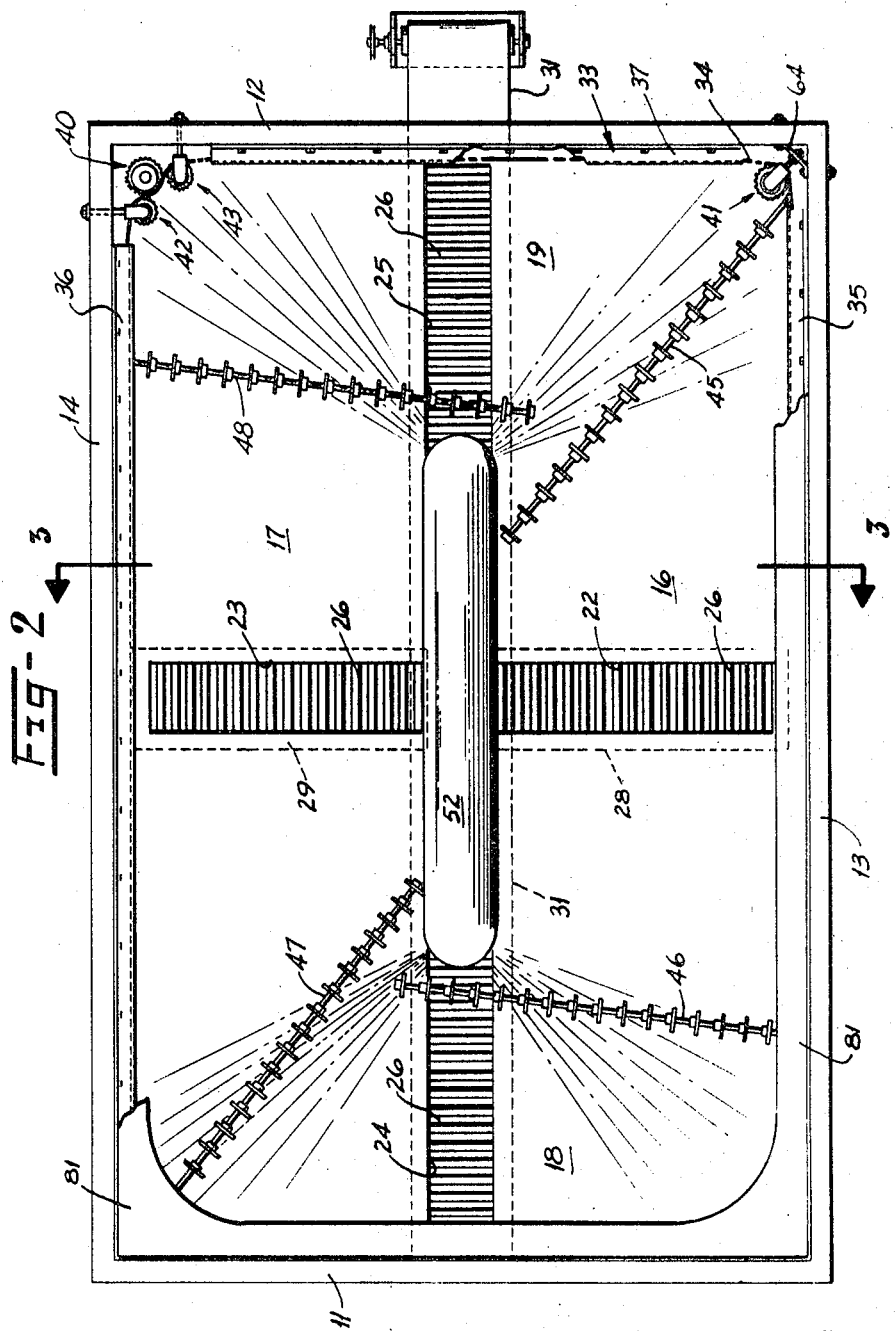

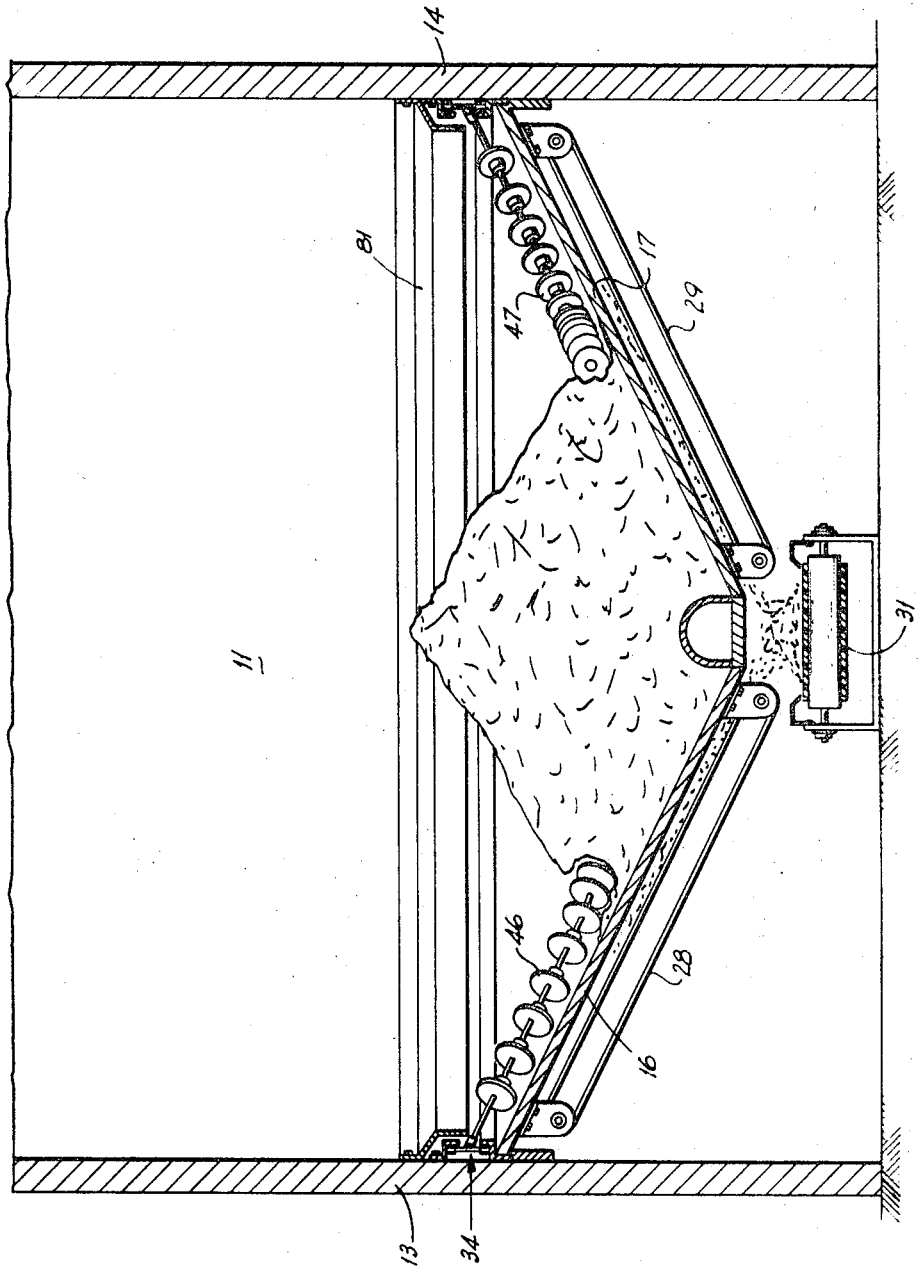

Sept. 30, 1969   J. L. PETERSON   3,469,719
NONCYLINDRICAL PARTICLE STORAGE FACILITY
Filed March 29, 1968   4 Sheets-Sheet 4
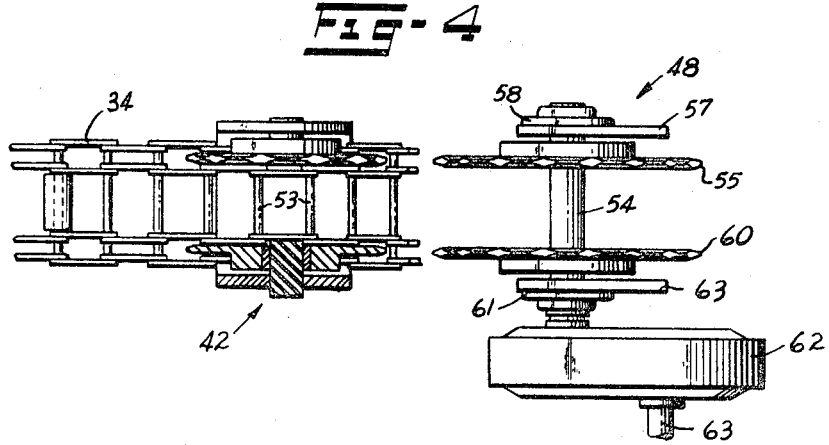
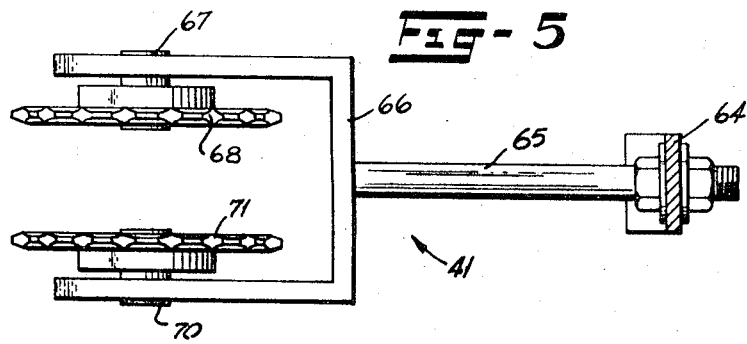
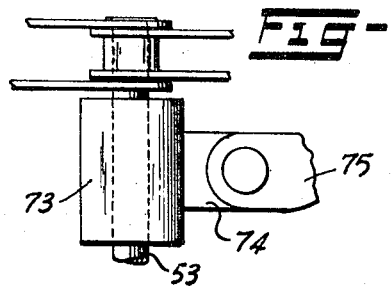
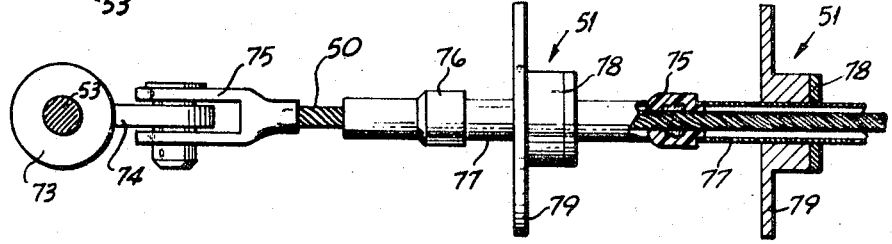
INVENTOR.
JOHN L. PETERSON
BY
Wells & St. John

United States Patent Office 3,469,719
Patented Sept. 30, 1969

3,469,719
NONCYLINDRICAL PARTICLE STORAGE FACILITY
John L. Peterson, Spokane, Wash., assignor to Atlas Spokane, Inc., a corporation of Washington
Filed Mar. 29, 1968, Ser. No. 717,241
Int. Cl. A01f 25/00; B65g 65/30
U.S. Cl. 214—17       6 Claims

ABSTRACT OF THE DISCLOSURE

A noncylindrical particle storage facility is described for storing sawdust or other nonflowing material in a pile and for systematically removing the same from the base of the pile. The particle storage facility has a floor with inclined surfaces that slope to the center for biasing the free end of flexible drag lines toward the center and against the base of the pile. Each drag line has a plurality of disc assemblies coaxially mounted about a flexible cable that is attached to a chain encircling the pile. The chain rides in a track that is affixed adjacent the walls of the facility. A drive means engages the chain to move the chain to drag the disc assemblies over the floor to remove sawdust from the pile and transfer the sawdust to apertures formed in the floor.

BACKGROUND OF THE INVENTION

This invention relates to particle storage facilities and more particularly to particle storage facilities that are noncylindrical and substantially rectangular in cross section and have transfer systems for systematically removing the particles from a patricle pile.

Many particle materials such as in silage, sawdust, and vermiculite are stored in enclosures in which the particles are irregularly dumped into the top of the enclosure to form a particle pile within the enclosure. Frequently it is necessary to remove the particles from the enclosure in a systematic and continuous flow. This is particularly important in the case of sawdust that is utilized as a source of fuel for power generation plants such as those commonly found in lumber, paper and plywood mills. Generally a conveyor system is mounted below the floor of the enclosure or storage facility for receiving the sawdust that falls by gravity through the apertures in the floor. However, over a period of time sawdust has a tendency to form arches or to "bridge" over the apertures in the floor thereby stopping the flow of sawdust.

To manually break the bridge is costly and dangerous. Several persons have lost their lives attempting to break such bridges that had formed in enclosures. Prior efforts to overcome the difficulty have been largely directed toward the use of rigid mechanical digging devices that are either rotated or extend radially outward from the center of the cylindrical storage facility as shown in U.S. Patents 2,755,942 and 2,736,461 or which extend diametrically across the pile as shown in U.S. Patents 2,792,153 and 2,496,146. In my U.S. Patent No. 3,011,658, I disclose an apparatus for transferring sawdust from a base of a pile. The apparatus includes a circular ring that is powered to turn about the center of the support floor. One end of a drag line is connected to the ring and the free end extends inwardly. As the ring rotates the angular movement of the ring causes the free end of the drag line to be urged inwardly against the base of the sawdust pile to remove sawdust from the pile and to break bridges that are formed in the sawdust pile.

This apparatus is suitable for installation in a cylindrical storage facility. However, it is not totally satisfactory in a noncylindrical storage facility that has a rectangular or substantially rectangular cross section. Another problem with the apparatus shown in my prior patent is the difficulty of pulling the pile engaging members from beneath a pile after a cave-in occurs.

One of the principal objects of this invention is to provide an apparatus for efficiently, economically and reliably removing particles from the base of a particle pile located in a noncylindrical enclosure.

A further object of my invention is to provide an apparatus for removing particles from the base of a particle pile that has digging elements that follow the path of least resistance to the exterior of the pile to reduce the pulling force that is required to pull the digging elements from beneath the pile.

An additional object of this invention is to provide an apparatus for removing particles from a pile house in a substantially rectangular enclosure that is inexpensive to manufacture, easy to maintain and requires a minimum of surveillance during operation.

These and other objects will become apparent upon reading the following detailed description of a preferred embodiment of this invention.

BRIEF DESCRIPTION OF THE DRAWINGS

A preferred embodiment of this invention is illustrated in the accompanying drawings, in which:

FIG. 1 is an elevated perspective storage facility that has a non-circular horizontal cross section;

FIG. 2 is a plan view of the particle storage facility showing flexible drag lines connected to a drive chain that encircles the inclined floor of the facility for dragging the flexible members over the floor with the free ends of the drag lines biasing inwardly to the center of the facility;

FIG. 3 is a vertical cross sectional view taken along line 3—3 in FIG. 2 showing a sawdust pile supported on inclined surfaces of the facility floor with the drag lines engaging the base of the pile;

FIG. 4 is a fragmentary side view of the drive chain and drive means for driving the chain;

FIG. 5 is a side view of a typical idler sprocket assembly for mounting in the corners of the facility for engaging and supporting the chain;

FIG. 6 is a fragmentary side elevation view of a chain link with a collar of the flexible drag line connected to the link; and FIG. 7 is a fragmentary plan view of a section of the flexible drag line showing the connection of drag line to the chain and a fragmentary cross section of a disc assembly.

DETAILED DESCRIPTION OF A PREFERRED EMBODIMENT

Referring in detail to FIG. 1, there is shown a particle storage facility generally designated by the arrow 10. The facility has a rectangular horizontal cross section with end walls 11 and 12 and side walls 13 and 14 surrounding a floor 15 that support particles such as sawdust in a central pile as shown in FIG. 3.

The floor 15 has inclined opposing flat surfaces 16 and 17 that extend from the side walls 13 and 14, respectively, downwardly towards the center of the floor 21. A curved inclined surface 18 extends from the end wall 11 downwardly towards the center 21 communicating with the side surfaces 13 and 14 to form a continuous floor at one end of the floor. A curved inclined surface 19 extends from the end wall 12 downwardly towards the center 21 communicating with the side surfaces 13 and 14 to form a continuous surface at the other end of the floor.

The angle of the inclined surfaces is less than the angle of repose of the particle material. The angle of repose for sawdust is normally between 40° and 55°. For the purpose of illustration only, the slope of the surfaces 16 and 17 is approximately 30° as shown in FIG. 3. At this slope the sawdust will not slide down the surfaces.

An elongated aperture 22 (FIG. 2) is formed in the flat inclined surface 16 and extends a substantial distance from the side wall 13 downwardly toward the center of the floor. A similar elongated aperture 23 extends substantially from the side wall 14 to the center of the floor. Opposing elongated end apertures 24 and 25 are formed in the curved inclined surfaces 18 and 19 respectively. The apertures 22–25 permit the particles to pass through the floor to a conveying system beneath the floor. Grating 26 is mounted in the apertures 22–25 for permitting the particles to flow therethrough while providing support for particle removing equipment.

A conveying system is mounted below the floor for receiving the particles and conveying the particles from the particle storage facility 10. The conveying system includes two cross conveyors 28 and 29 (FIG. 3) that are mounted beneath the apertures 22 and 23 for conveying the particles downwardly to the longitudinal conveyor 31 that is positioned beneath the elongated apertures 24 and 25 and extends from the particle storage facility for conveying the particles therefrom.

In cooperation with the inclined surfaces 16 and 17, the storage facility has a particle transfer system that removes the particles from the base of the pile as shown in FIG. 3. The particle transfer system includes a track system 33 (FIG. 2) that extends around the periphery of the inside of the particle facility immediately above the floor and adjacent the walls for slidably supporting a continuous double link chain 34. The track system 33 includes a track section 35 (FIG. 2) adjacent the side wall 13, a track section 36 adjacent the side wall 14, a track section 37 adjacent the end wall 12 and a track section (not shown) adjacent the end wall 11.

Sprocket assemblies engage the chain at the corners of the facility for minimizing the wear of the chain and to facilitate the movement of the chain about the interior of the facility 10. One of the sprocket assemblies is a drive sprocket assembly 40 engaging the chain for driving the chain along the tracks. As illustrated in FIG. 2 the drive sprocket assembly 40 is located in the corner between the side wall 14 and the end wall 12. Idler sprockets are positioned in the other three corners with a typical idler sprocket assembly 41 illustrated in FIG. 5. Two idler sprocket assemblies 42 and 43 are positioned adjacent the drive sprocket assembly 40 for biasing the chain against the drive sprocket to minimize the wear and friction.

Flexible drag means 45–48 (FIG. 2) are connected to the chain at evenly spaced locations about the chain with the free ends of the flexible drive means permitted to slide on the floor 15. The length of each drag means is greater than half the width of the facility, but less than the full width. Each of the flexible drag means 45–48 has a flexible cable 50 (FIG. 7) with a plurality of pivotally interconnected disc assemblies 51 coaxially mounted thereon for providing digging instruments or elements for engaging the base of the particle pile to remove the particles therefrom and move the particles to the floor apertures.

As shown in FIGS. 1–3, an upright divider 52 is mounted at the center of the floor extending upwardly therefrom for preventing the free ends of the flexible drag lines 45–48 from becoming entangled with each other.

The chain drive sprocket assembly 40 is shown in detail in FIG. 4. The two links of the chain 34 are separated by lateral spacers 53. The drive sprocket assembly 40 includes a shaft 54 that has two spaced sprockets 55 and 56 for engaging the laterally spaced links of the chain. The upper end of the shaft 54 is supported by a bracket 57 through a bearing 58. The lower end of the shaft 54 is supported by a bracket through a bearing 61. The lower end of the shaft 54 is interconnected to a speed reduction unit 62. The input shaft 63 interconnects the gear reduction unit with a motor or drive means that is not shown.

Each of the idler sprocket assemblies 41 includes a bracket 64 that is mounted to the walls. An adjustable tension rod 65 is connected to the bracket 64 for supporting a C-shaped frame 66. A freely rotatable stud shaft 67 is supported on the upper portion of the frame 66 with an idler sprocket 68 mounted thereon for engaging the upper link of the chain. A freely rotatable stud shaft 70 is mounted on the lower portion of the C-shaped frame opposing the stud shaft 68 and supporting an idler sprocket 71 that engages the lower link of the chain 34.

Each of the flexible drag means 45–48 is connected to the chain in a manner shown in FIGS. 6 and 7. A collar 73 is rotatably mounted on one of the spacers 53. The collar 73 has a radial lug 74 mounted thereon for connecting to a cable yolk 75. The yolk is affixed to the end of the flexible cable 50. The disc assemblies are coaxially mounted on the cable 50. Each disc assembly 51 has a socket 76 that is rigidly fixed to the cable. A cylinder 77 has one end mounted to the rear of the socket 76 and extends therefrom for slidable engagement with the face of the adjacent socket. An annular shoulder 78 is formed on the outer surface of the cylinder 77. An upright disc is coaxially mounted about the cylinder and cable for rotational movement thereabout. The hub of the disc 79 engages the annular shoulder 78 to limit the axial movement of the disc.

A shield of deflector 81 (FIGS. 1–3) is mounted to the inside of the walls 11–14 immediately above and overlying the track system 33 for preventing the particles from interfering with the movement of the chain 34 in the track.

During the operation the sawdust is normally fed into the particle storage facility from the top with the sawdust descending to the floor to form a sawdust pile in a substantially inverted conical shape. The angle of the inclined surfaces 16–18 is less than the angle of repose of the sawdust but sufficient to bias the free ends of the drag means toward the center by gravity. The angle of the inclined surfaces 16, 17 is sufficient to permit the free ends of the flexible drag lines to slide or roll toward the center of the floor to bias the discs 79 against the base of the sawdust pile as shown in FIG. 3. As the drag means 45–48 move over the floor the particles are removed from the base of the sawdust pile and pulled over the apertures 25–28. In this manner the disc assemblies will gradually eat into the base of the pile in a systematic manner for preventing the formation of bridges over the floor apertures and to provide a constant flow of sawdust onto the conveyor system.

One of the significant features of the flexible drag means is its flexibility and the configuration of disc assemblies so that when the flexible drag means becomes buried underneath the sawdust pile, the tension on the cable will cause the discs 79 to seek paths of least resistance from the pile to remove the free ends of the cables from beneath the sawdust pile. Instead of moving along the line of pulling force the disc assemblies will swivel to one side or the other to reduce the projected profile of the discs.

It should be understood that the above described embodiment is simply illustrative of the principles of this invention and numerous modifications may be made without deviating from the principles thereof. Therefore, only the following claims are intended to define this invention.

What I claim is:

1. A noncylindrical particle storage facility for receiving particles such as sawdust in a pile and for continuously removing particles from the base of the pile, said facility has end walls and side walls in which the distance between the side walls is less than the distance between the end walls, in combination with the improvement of:
   (a) a floor for supporting the pile, said floor having inclined surfaces adjacent the side walls that extend downwardly toward the center of the floor with the angle of inclination of said surfaces being less than the angle of repose of the particles to prevent the natural flow of the particles along the inclined surfaces, said floor having at least one elongated aperture formed therethrough for permitting the flow of particles therethrough;

(b) a particle conveying means located below the floor aperture for receiving the particles and conveying the particles from the storage facility;

(c) an elongated drag means slidably mounted on the floor engaging the base of the pile; and (d) a drive means adjacent the walls encircling the particle pile and connected to only one end of the drag means for moving the drag means over the floor with the free end of the drag means biased down the inclined surfaces by gravity against the base of the pile to remove the particles from the pile and move the particles to the floor aperture and onto the conveyor means for conveyance from the storage facility.

2. A particle storage facility as defined in claim 1 wherein the elongated drag means includes a plurality of pivotally interconnected disc assemblies having upright discs for engaging the base of the pile and for moving the particles to the floor aperture as the drag means is pulled over the floor by the drive means.

3. A particle storage facility as defined in claim 1 wherein the drive means includes a continuous chain that moves in a noncircular path adjacent the walls with the connected end of the drag means affixed to the chain.

4. A particle storage facility as defined in claim 2 wherein the elongated drag means further includes a flexible cable interconnecting the disc assemblies and wherein each of the discs are rotatably mounted coaxially about the cable for facilitating the movement of the free end of the drag means down the inclined surfaces.

5. A particle storage facility as defined in claim 1 further comprising a plurality of elongated drag means each having a length less than the distance between the side walls but greater than one half of said distance and an elongated divider positioned at the center of the floor for preventing the free ends of the elongated drive means from becoming entangled.

6. A particle storage facility as defined in claim 5 wherein the elongated drag means are connected to the drive means at equally spaced locations.

References Cited

UNITED STATES PATENTS 1,530,659  3/1925  Force _____ 214—17 XR
3,011,658  12/1961  Peterson _____ 214—10

ROBERT G. SHERIDAN, Primary Examiner

U.S. Cl. X.R.

222—228